US009484609B2

(12) United States Patent
Reza et al.

(10) Patent No.: US 9,484,609 B2
(45) Date of Patent: Nov. 1, 2016

(54) MICROWAVE COUPLING STRUCTURE FOR SUPPRESSING COMMON MODE SIGNALS WHILE PASSING DIFFERENTIAL MODE SIGNALS BETWEEN A PAIR OF COPLANAR WAVEGUIDE (CPW) TRANSMISSION LINES

(71) Applicant: Raytheon Company, Waltham, MA (US)

(72) Inventors: Shahed Reza, Boxborough, MA (US); Michael F. Parkes, Spencer, MA (US); Kenneth A. Wilson, Salem, MA (US)

(73) Assignee: RAYTHEON COMPANY, Waltham, MA (US)

( * ) Notice: Subject to any disclaimer, the term of this patent is extended or adjusted under 35 U.S.C. 154(b) by 48 days.

(21) Appl. No.: 14/196,691

(22) Filed: Mar. 4, 2014

(65) Prior Publication Data

US 2015/0255842 A1 Sep. 10, 2015

(51) Int. Cl.
*H04B 3/28* (2006.01)
*H01P 1/162* (2006.01)
*H01P 3/00* (2006.01)

(52) U.S. Cl.
CPC ............... *H01P 1/162* (2013.01); *H01P 3/003* (2013.01)

(58) Field of Classification Search
CPC ..... H01P 1/162; H01P 3/003; H03H 1/0007; H03H 7/427
USPC .......................................... 333/12, 181, 185
See application file for complete search history.

(56) References Cited

U.S. PATENT DOCUMENTS

| | | | | |
|---|---|---|---|---|
| 5,138,287 | A | 8/1992 | Domokos et al. | |
| 5,173,671 | A | 12/1992 | Wendler et al. | |
| 6,023,209 | A | 2/2000 | Faulkner et al. | |
| 8,624,688 | B2 * | 1/2014 | Essenwanger | 333/26 |
| 2015/0070102 | A1 * | 3/2015 | Dai et al. | 333/12 |

OTHER PUBLICATIONS

U.S. Appl. No. 14/196,678, filed Mar. 4, 2014, 13 pages.
Hakan P. Partal., Ph.D., Advanced Implementations of Microwave Passive Circuits, Dept. of EECS, Syracuse University, ELE 791, Summer 2011, pp. 1-18.
W. Heinrich, J. Gerdes, F.J. Schmuckle, C. Rheinfelder, K. Strohm, Coplanar Passive Elements on Si Substrate for Frequencies up to 110 GHz, Short Papers, IEEE Transactions on Microwave Theory and Techniques, vol. 46, No. 5, May 1998, pp. 709-712.
Office Action Mailed Jun. 6, 2015 U.S. Appl. No. 14/196,678, filed Jun. 6, 2015.
T. Gokdemir, S.B. Economides, A. Khalid, A.A. Rezazadeh, I.D. Robertson, Design and Performance of GaAs MMIC Baluns Using Overlaid and Spiral Couplers, Department of Electronic and Electrical Engineering, King's College, Strand, London, 1997 IEEE MIT-S Digest, WE1B-s, pp. 401-404.

(Continued)

*Primary Examiner* — Robert Pascal
*Assistant Examiner* — Kimberly Glenn
(74) *Attorney, Agent, or Firm* — Daly, Crowley, Mofford & Durkee, LLP

(57) ABSTRACT

A transmission line structure having a pair of separated coplanar waveguide transmissions line section. A coupling circuit is coupled between the pair of coplanar waveguide transmissions line sections, the coupling circuit suppresses common mode signals therein and passes, substantially unsuppressed, differential mode signal transmission between the pair of coplanar waveguide transmissions line sections.

11 Claims, 11 Drawing Sheets

(56) References Cited

OTHER PUBLICATIONS

Winifried Bakalski, Werner Simburger, Herbert Knapp, Hans-Dieter Wohlmuth, Arpad L. Scholtz, Lumped and Distributed Lattice-type LC-Baluns, Student Paper, Infineon Technologies AG, Munich, Germany, 2002 IEEE MIT-s Digest, pp. 209-212.
Kenichi Okada, Kazuya Masu, Modeling of Spiral Inductors, Tokyo Institute of Technology, Japan, Apr. 2010, pp. 292-313.
Response to Final Rejection filed in U.S. Appl. No. 14/196,678.

* cited by examiner

MICROWAVE COUPLING STRUCTURE FOR SUPPRESSING COMMON MODE SIGNALS WHILE PASSING DIFFERENTIAL MODE SIGNALS BETWEEN A PAIR OF COPLANAR WAVEGUIDE (CPW) TRANSMISSION LINES

TECHNICAL FIELD

This disclosure relates generally to microwave coupling structures and more particular to microwave coupling structure for suppressing common mode signals while passing differential mode signals between a pair of coplanar waveguide (CPW) transmission lines.

BACKGROUND

As is known in the art, a coplanar waveguide (CPW) structure includes: a center conductor disposed over a surface of a substrate; and a pair of ground plane conductors disposed over the upper or top surface of the substrate, the center conductor being disposed between the pair of ground plane conductors, Microwave energy fed to an input of the CPW propagates to an output in a differential transmission mode with the electromagnetic field being near the surface substrate. CPW has been and continue to being used in wide variety of integrated circuit and circuit board applications. However, being a three conductor system, CPW structures are vulnerable to propagation of unwanted common mode(s). For example, in many applications the integrated circuit having active elements interconnected on the top, or upper, surface of a common substrate and a conductor is disposed on the bottom surface of the substrate for mounting to a heat sink or to a system ground conductor, for example. In this example, a parallel plate region is formed between the conductors on the upper surface, particularly, when larger ground plane conductors are used for the CPW transmission line, and the conductor on the bottom surface.

More particularly, a microwave parallel plate region includes a pair of conductors disposed over opposite surfaces of a substrate. When such parallel plate region is used as a portion of a CPW microwave transmission line, such as the pair of ground plane conductors on the top or upper surface of the substrate, unwanted, parasitic, parallel plate modes may be generated (moding), supported between the pair of conductors, and then transmitted through the parallel plate region. In one application, a substrate may be used to realize a Monolithic Microwave Integrated Circuit (MMIC) chip having a plurality of electrical components, including amplifiers, for example, with a conductor on the bottom of the substrate, for providing a system ground or for soldering to a printed circuit board or heat sink, for example, and conductors on the top of the substrate. In such chip, CPW transmission lines are used on the top or upper surface of the chip to interconnect elements of the amplifier, or different amplifiers or electrical components, for example, as shown in FIG. 1. It is noted that input and output CPW structures are used to input microwave energy to the chip and from the chip, as indicated in FIG. 1. In any event, as a result of the top CPW transmission line conductors and bottom conductors, parallel plate moding may be generated. If the generated moding has frequencies within the bandwidth of the amplifier with magnitudes equal to, or greater than, the forward gain of the amplifier, a portion of the output energy produced by the amplifier may be coupled back to the input of the amplifier providing positive feedback thereby generating unwanted oscillations.

Common mode generation may also result from interference from other sources, such as, for example; coupling of external signals, unbalanced excitation or unbalanced ground paths.

Thus, while CPW transmission uses a differential mode transmission, these other sources can generate common modes that can propagate through the CPW transmission lines as unwanted signals and become a source of parasitic unwanted common mode signals that propagate through the one or more of the center conductors and pair of ground plane conductors and adversely affect the performance and operation of the MMIC.

SUMMARY

In accordance with the present disclosure, a transmission line structure is provided having; a pair of separated coplanar waveguide transmissions line sections; and a coupling circuit coupled between the pair of coplanar waveguide transmissions line sections. The coupling circuit suppresses common mode signals and passes, substantially unsuppressed, differential mode signal transmission between the pair of coplanar waveguide transmissions line sections.

In one embodiment, the circuit is disposed on a top surface of a substrate and the circuit includes a resistor for passing the common mode signals to a ground plane conductor disposed on a bottom surface of the substrate.

In one embodiment, each one of the pair of separated coplanar waveguide transmissions line sections includes as a pair of separated ground plane conductors disposed on the upper surface of a substrate, each one of the separated ground plane conductors forming a parallel plate with a conductor disposed on the bottom surface of the substrate. The circuit couples one of the pair of ground plane conductors to the other one of the pair of ground plane conductors.

In one embodiment, a parallel plate structure has an upper plate and a lower plate, one of the plates having two separated regions. A coupling circuit is coupled between the separated regions for suppressing common mode signals in one of the plates passing between the two regions and passing, substantially unsuppressed, differential mode signal transmission between the two regions.

Thus, circuit servers as a choke to common mode microwave signals and a CPW transmission line for differential mode microwave signals.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

Referring now to FIG. 2, a microwave system 200 is shown having an input structure 202 coupled to an output structure 204 through a MIMIC chip 206. The chip 206 has formed on a top or upper surface 207 of a semiconductor substrate 208 a plurality of devices 210, active and passive, for example, interconnected by CPW transmission lines 212, as indicated. A conductor 213 (FIG. 3A), is formed on the bottom surface of the MMIC chip 206 for mounting to a system ground or heat sink, not shown, for example.

Figure 1:
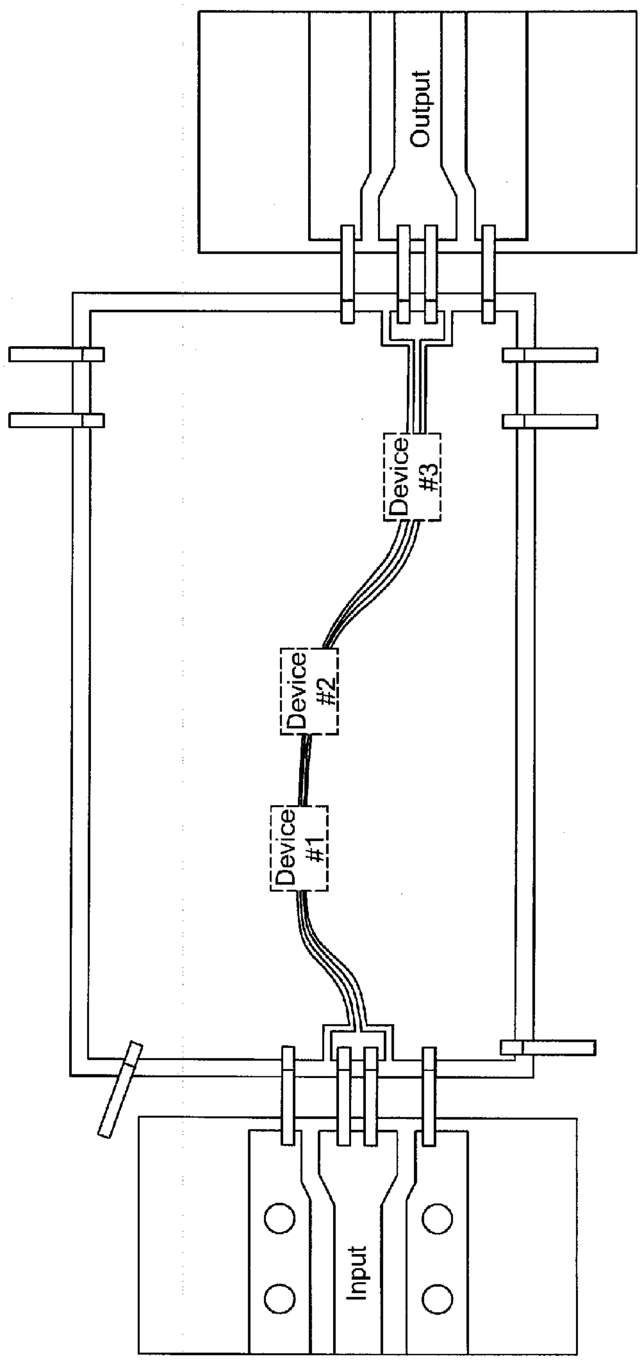
FIG. 1 PRIOR ART
FIG. 1 is a microwave system having an input structure coupled to an output structure through a MMIC chip according to the PRIOR ART.
Figure 2:
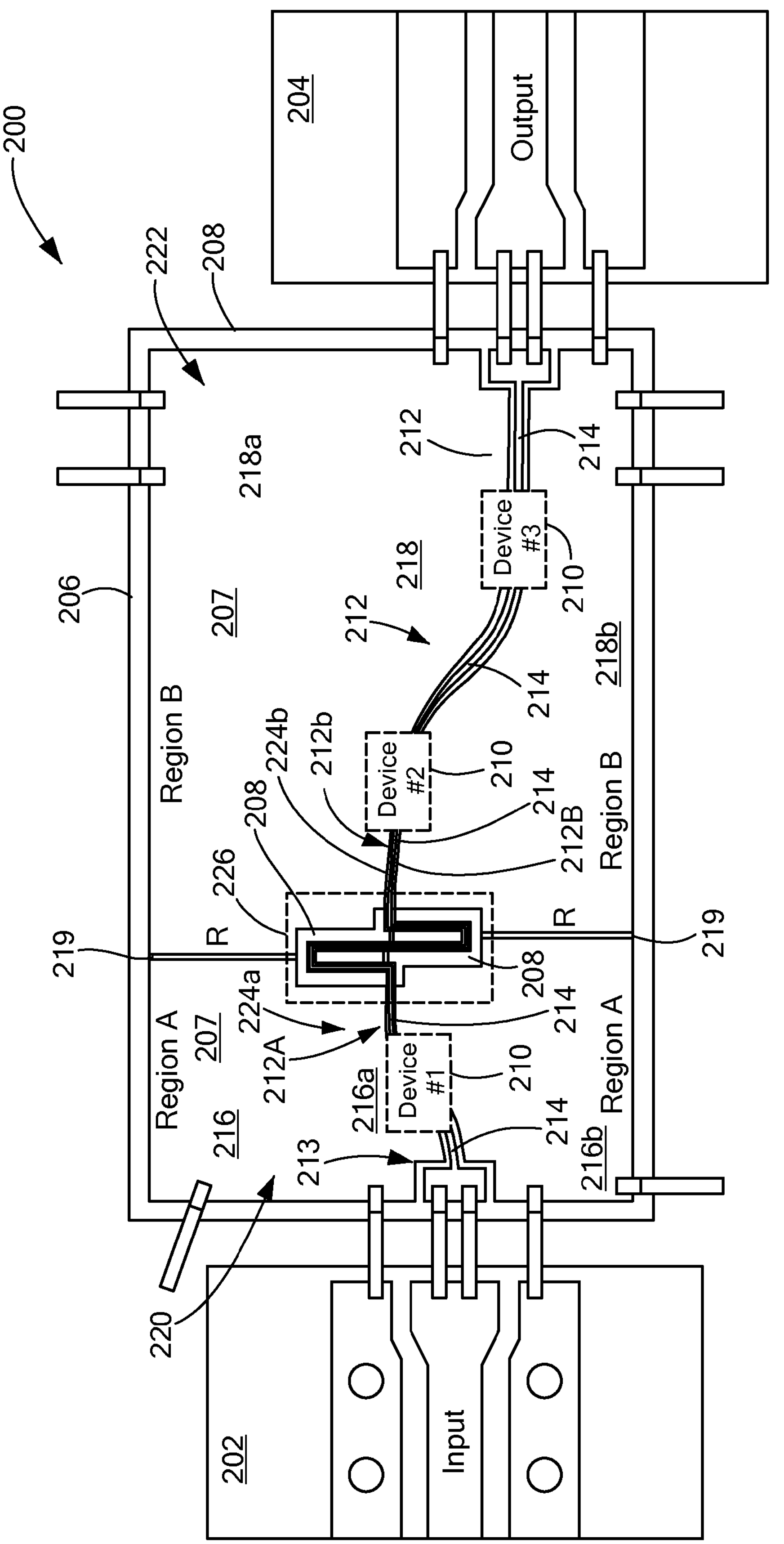
FIG. 2 is a microwave system having an input structure coupled to an output structure through a MMIC chip according to the disclosure.

The CPW transmissions lines 212 (FIG. 2) include a center, or signal conductor 214 having a pair of ground planes conductors 216, 218, one of the ground plane conductors 216, 218 being on each side of the center conductor 214, as indicated. It is noted that a region 219 separates the ground plane conductors 216 (nearer the input structure side 220 of the chip 206) from the pair of ground plane conductors 218 (nearer the output structure side 222 of the chip 206). Thus, here two separated parallel plate regions, A and B are formed: region A being made up of ground plane conductor sections 216*a*, 216*b*; and region B being made up of ground plane conductor sections 218*a*, 218*b*. Thus, two separate coplanar waveguide transmissions line sections 224*a*, 224*b* are formed and terminate at the separation region 219 between regions A and B. It is also noted that the segmented regions A and B are asymmetrical in surface area here region A being smaller than region B. Since the frequency of the mode in a parallel plate is inversely proportional to the dimension of the plate (metallization), segmenting the plate asymmetrically, disrupts the mode that would be generated had the plate not been segmented and may even create separate mode for each segment thus weakening the coupling between input and output of the chip and shifting the mode frequency away from a band of interest; the nominal operating frequency band of the chip. Thus, by asymmetrically segmenting the top plate into two or more segments, here regions A and B, each segment or region can designed to have its own resonance frequency. If the resonance frequencies of the region A and region B are different, then the input-output coupling will diminish thereby improving isolation.

It is noted that signal and ground continuity of the CPW transmission lie terminating at the separation 219 between the segments or regions A and B across the needs to be maintained across the separation 219, Therefore, by segmenting the two segments or regions A and B, two CPW transmission lines 212A and 212B are formed; CPW transmission line section 212A having ground plane conductor sections 216*a*, 216*b* and CPW section 212B having ground plane conductor sections 218*a*, 218*b*. Here, the signal and ground continuity are maintained by a coupling circuit 226, such coupling circuit 226, shown more clearly in FIGS. 3 and 3A) suppressing common mode signals and passing, substantially unsuppressed, differential mode signal transmission between the pair of coplanar waveguide transmissions fine sections 212A and 212B. Thus, the coupling circuit 226 serves as a choke, or inductor, to common mode microwave signals and a CPW transmission line for differential mode microwave signals.

Figure 3:
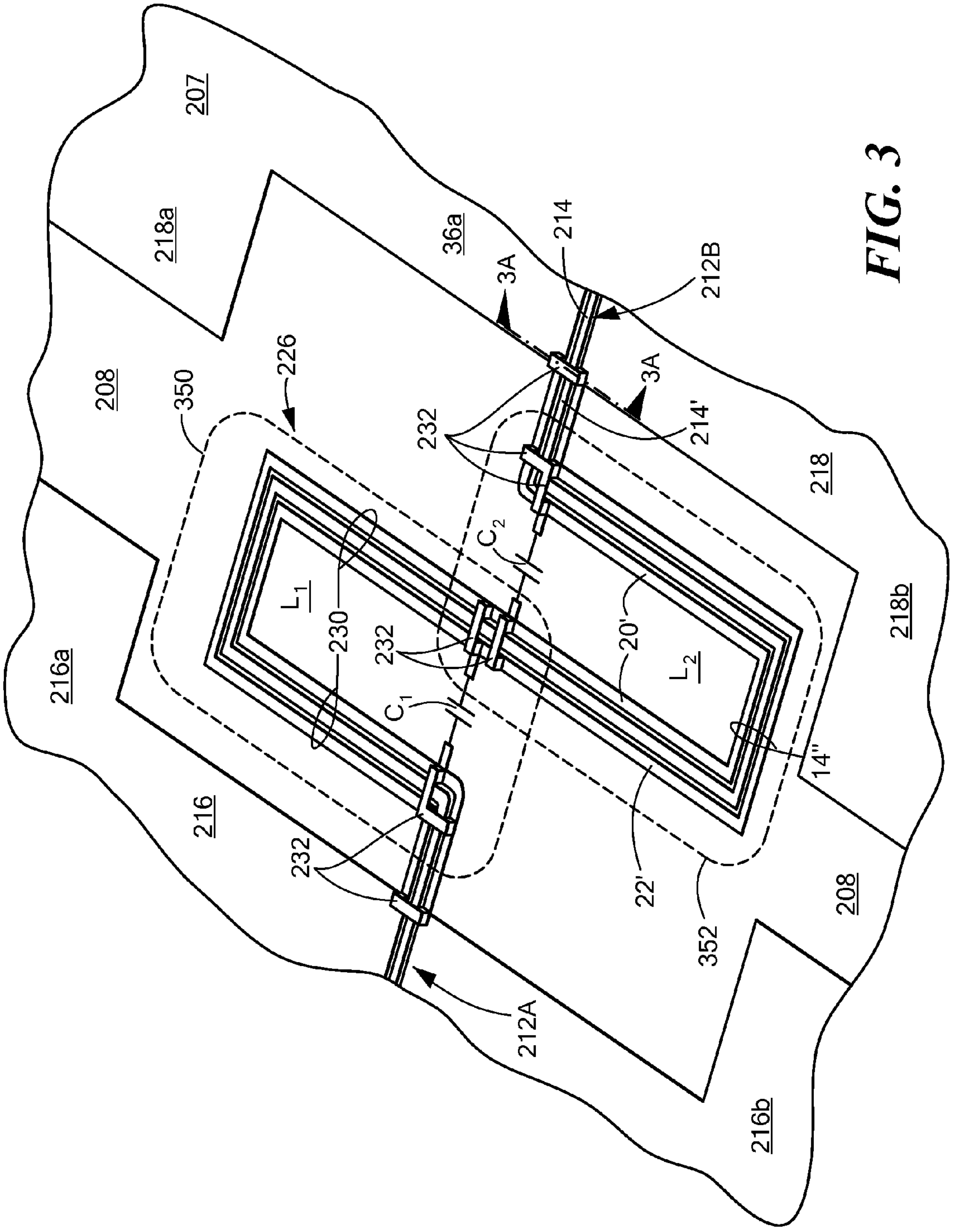
FIG. 3 is an isometric view of a portion of the MMIC chip of FIG. 2, such portion showing a coupling circuit used therein.
Figure 3A:
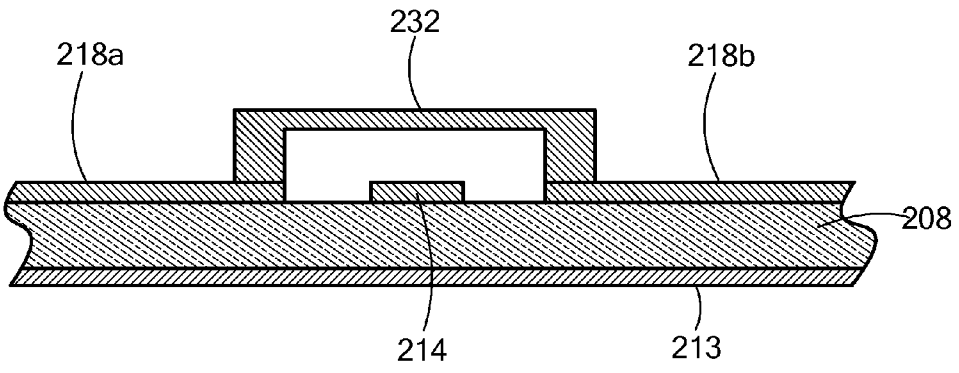
FIG. 3A is a cross sectional view of a portion of the coupling circuit of FIG. 3, such cross section being along line 3A-3A in FIG. 3.

Referring now to FIGS. 3 and 3A, the coupling circuit 226 is shown having: the insulating substrate 208 (FIG. 3A) and a coplanar waveguide transmission line 230 connected between formed in a meander line configuration over the upper surface 207 of the is substrate 208 and interconnecting coplanar waveguide transmissions line sections 212A and 212B. The coplanar waveguide transmission line 230 includes: a center conductor 214', which is merely an extension of the center conductor 214; and a pair of ground plane conductors 20', 22', which are connected to the ground plane conductors 216, 218. Thus, the meander line coplanar waveguide section 230 provides a continuous coplanar waveguide section interconnection the coplanar waveguide transmissions line sections 212A and 212B and passes substantially unsuppressed differential mode signals between the coplanar waveguide transmissions line sections 212A and 212Ba. It is noted that the ground plane conductor pairs 216*a*, 216*b*, and 218*a*, 218*b* are connected by airbridges 232 that span over the center conductors 214, as shown more dearly in FIG. 3A. The structure 226 may be formed using conventional photolithographic-etching processes.

Figure 4A:
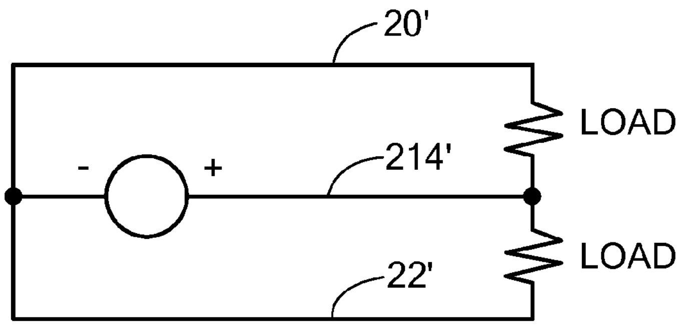
FIG. 4A is an equivalent circuit of the coupling circuit of FIG. 3 when such circuit is fed microwave energy having a differential mode of propagation.
Figure 4B:
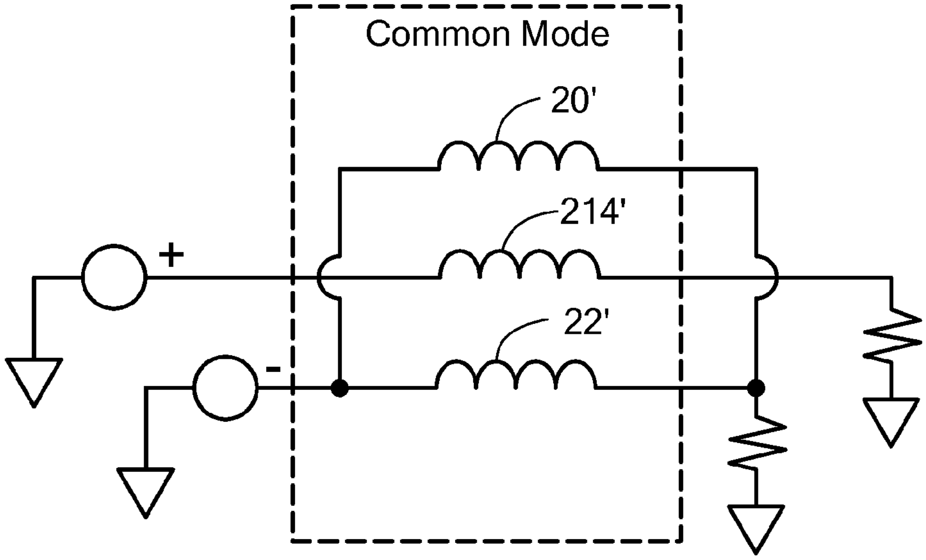
FIG. 4B is an equivalent circuit of the coupling circuit of FIG. 3 when such circuit is fed microwave energy having a common mode of propagation.

As noted above, the coplanar waveguide transmission line 230 connected between is formed in a meander line configuration. More particularly, the center conductor 214' and the pair of ground plane conductors 20' and 22' are configured a meander line inductor. Thus, here there are two, serially connected inductors L1 and L2 formed by each one of the three conductors 20', 22' and 214'. A capacitor C1 and C2 is connected in parallel with each corresponding one of the inductors L1, L2 forming a pair of serially connected resonant tank, circuits 350, 352, respectively as shown. These L-C resonant tank circuits 350, 352 are tuned to the undesired common mode signals; however, because the CPW transmission line formed by three conductors 20', 22' and 214' provide a differential line (the signal line 214' has its own ground plane lines 20'; 22' on either side and on the same surface), differential mode signals pass through the CPW line without being effected by the tank circuits 350, 352. FIG. 4A is a schematic diagram of a differential mode equivalent circuit of the coupling circuit 226 and FIG. 4B is a schematic diagram of a common mode equivalent circuit of the coupling circuit 226.

Figure 5:
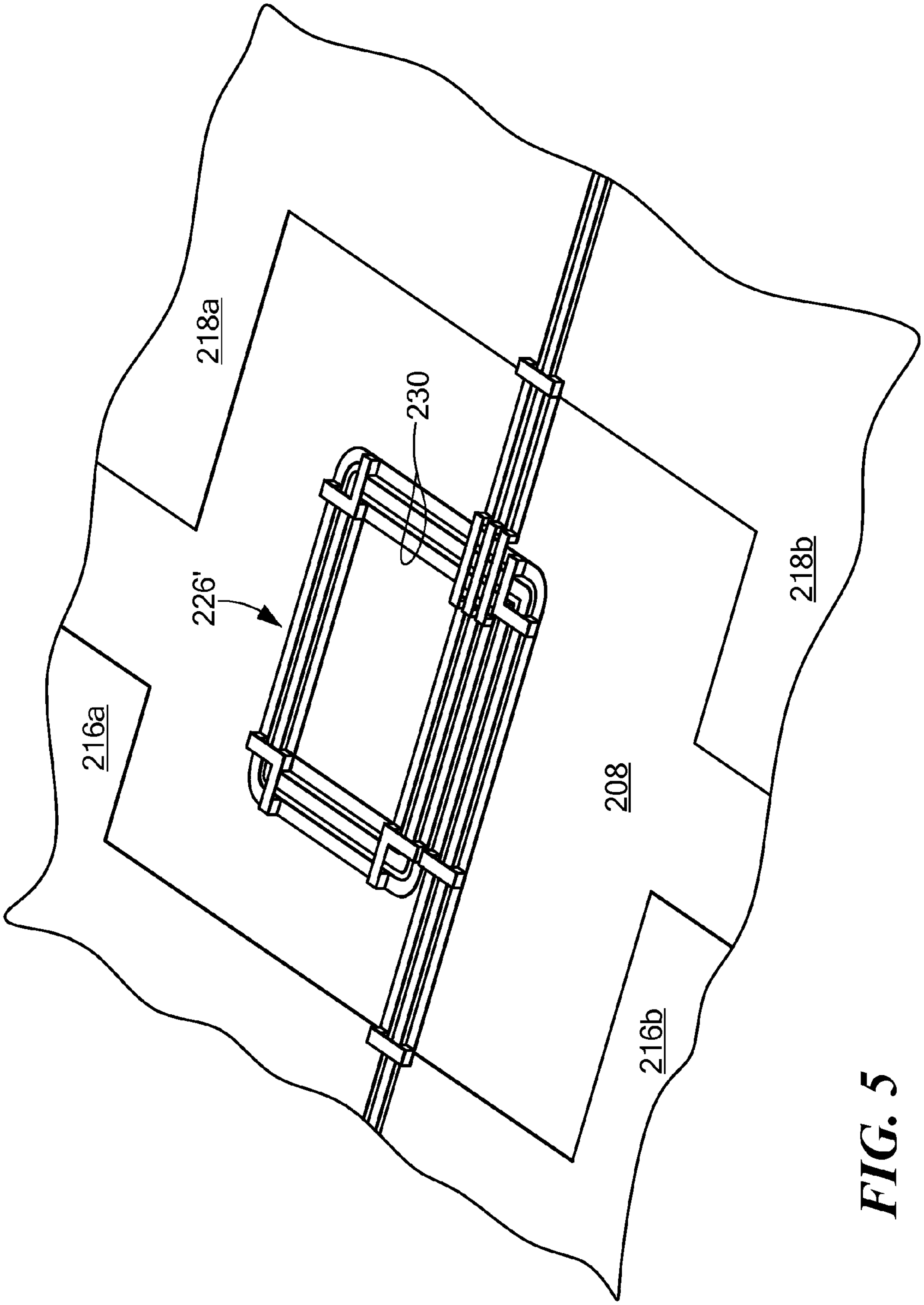
FIG. 5 is an isometric view of a portion of the MMIC chip of FIG. 2, such portion showing an alternative coupling circuit used therein.

FIG. 5 shows an alternative embodiment of the coupling circuit 226, here coupling circuit 226'. Here, the coplanar waveguide transmission line 230 is formed in a spiral configuration and again provides a continuous coplanar waveguide section interconnecting the coplanar waveguide transmissions line sections 212A and 212B (FIG. 2) and passes substantially unsuppressed differential mode signals between the coplanar waveguide transmissions line sections 212A and 212B (FIG. 2) while the spiral shape provides an inductor to the common mode signals thereby suppressing undesired common mode signals. More particularly, the spiral inductors are to provide a large impedance to the common mode signals to suppress such common mode signals; however, the three conductors forming a CPW transmission line, allow differential mode signals to pass between the regions A and B.

Figure 6:
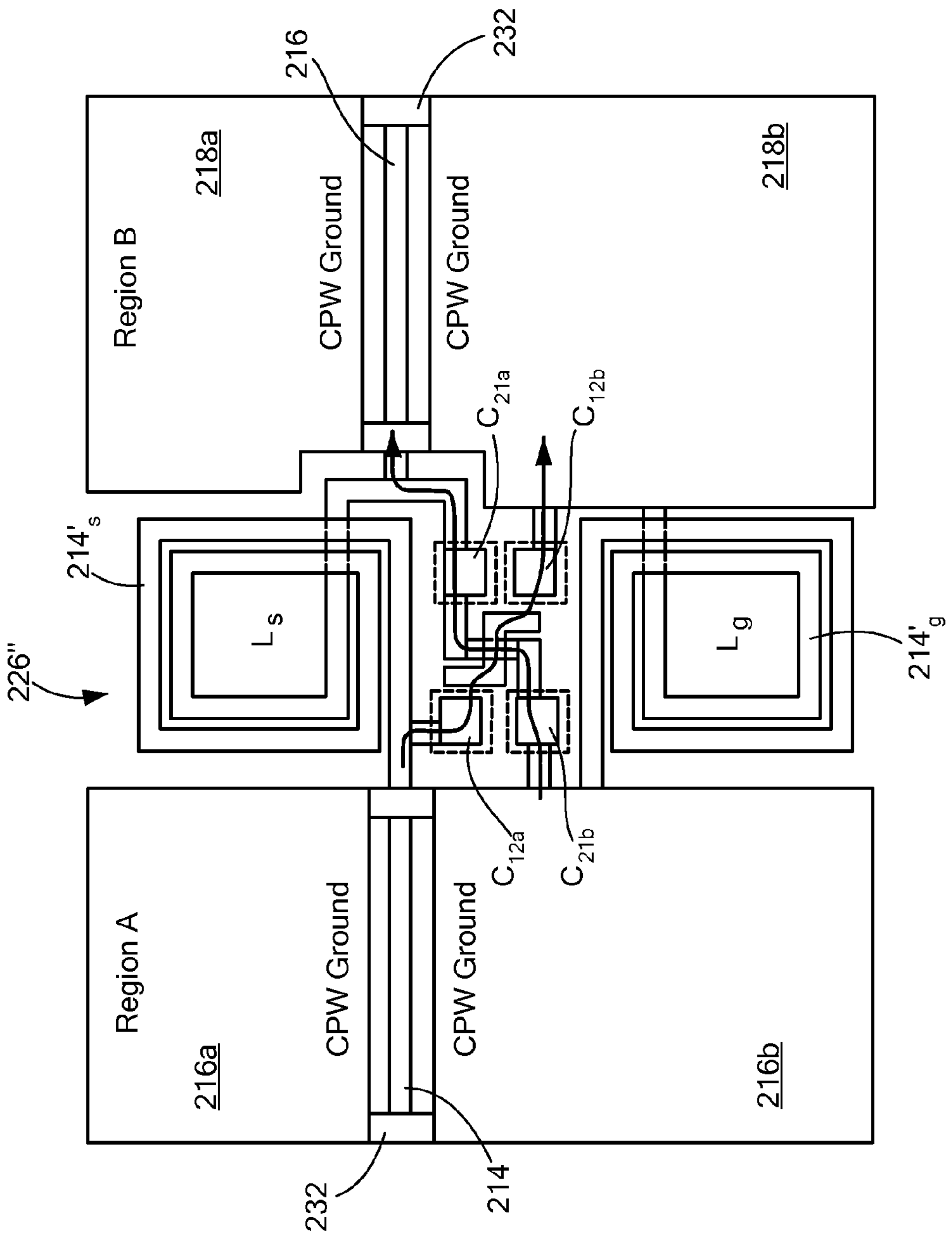
FIG. 6 is an isometric view of a portion of the MMIC chip of FIG. 2, such portion showing another alternative coupling circuit used therein.

FIG. 6 shows an alternative embodiment of the coupling circuit 226, here coupling circuit 226". Coupling circuit 226" includes a spiral shaped conductor $214_s$' connecting the center conducer 214 of Region A to the center conductor 216 of Region B and a spiral shaped conductor $214_g$' connecting the ground plane conductor 216*b* of Region A (which is connected to the ground plane conductor 216*a* of region A by air bridge 232) to the ground plane conductor 218*b* of Region B (which is connected to the ground plane conductor 218*a* of region B by air bridge 232), as shown. The signal conductor 214 of Region A is also Radio Frequency (RF) coupled, through a pair of serially connected capacitors $C_{12a}$, $C_{12b}$, to the connected ground plane conductors 216*a*, 218*b* of Region B, as shown. The connected ground plane conductors 216*a*, 216*b* of Region A is Radio Frequency (RF) coupled, through a pair of serially connected capacitors $C_{21a}$, $C_{21b}$, to the center conductor 216 of Region B, as shown.

Figure 6A:
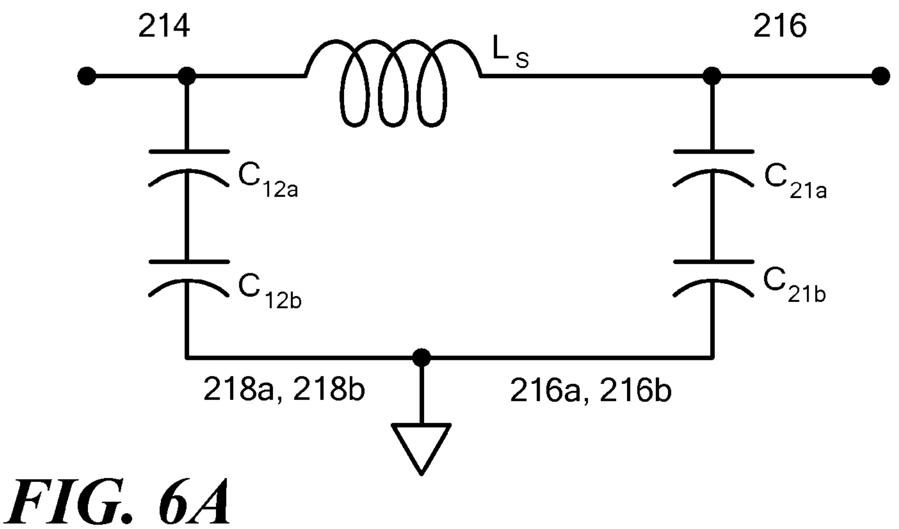
FIG. 6A is an equivalent circuit of the coupling circuit of FIG. 6 when such circuit is fed microwave energy having a differential mode of propagation.
Figure 6B:
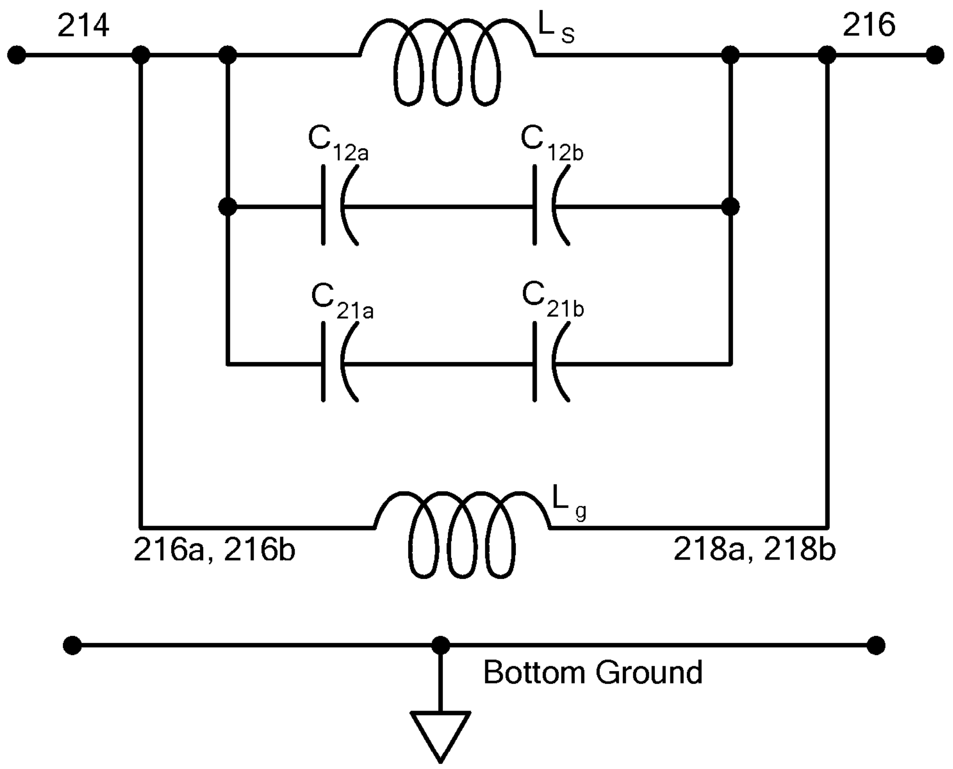
FIG. 6B is an equivalent circuit of the coupling circuit of FIG. 6 when such circuit is fed microwave energy having a common mode of propagation.

Thus, referring to FIG. 6A, a balanced CPW signal between the signal line 214 of Region A and the ground plane conductors 216*a*, 216*b* of Region A is coupled (after passing through low pass filter configuration constituted by capacitors $C_{12a}$, $C_{12b}$, $C_{21a}$, $C_{21b}$ and the inductor $L_s$) as a differential CPW signal between the signal line 216 of Region B and the ground plane conductors 218*a*, 218*b* of Region B. The low pass filter has a cutoff frequency greater than the frequency of the CPW signal. However, as shown in FIG. 6B, to a common mode signal on the signal line 214 of Region A and the ground plane conductors 216*a*, 216*b* of Region A, referenced to the bottom ground conductor 213 on the bottom of the MMIC chip (FIG. 3) is blocked by the parallel LC tank circuit formed by the spiral shaped inductors $214_s$' and $214_g$' and the capacitors $C_{12a}$, $C_{12b}$, $C_{21a}$, $C_{21b}$. The tank circuit has a resonance frequency at the frequency of the common mode signal. Thus, the common mode signal is suppressed while the differential mode signal passes substantially unsuppressed between the Region A and the Region B.

Figure 7A:
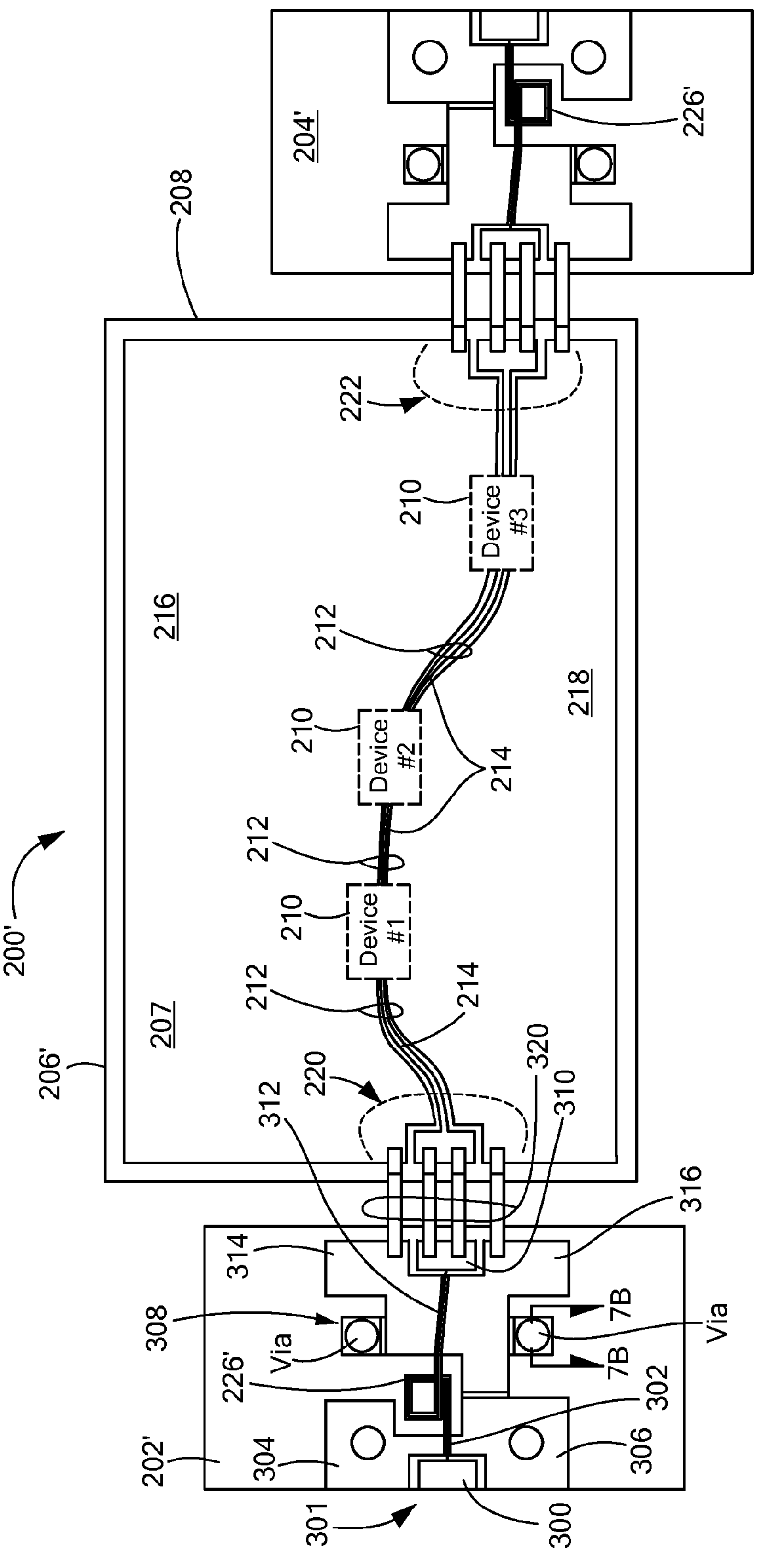
FIG. 7A is a microwave system having an input structure coupled to an output structure through a MMIC chip according to the disclosure; the input and output structures having differential mode suppression circuits according to the disclosure.
Figure 7B:
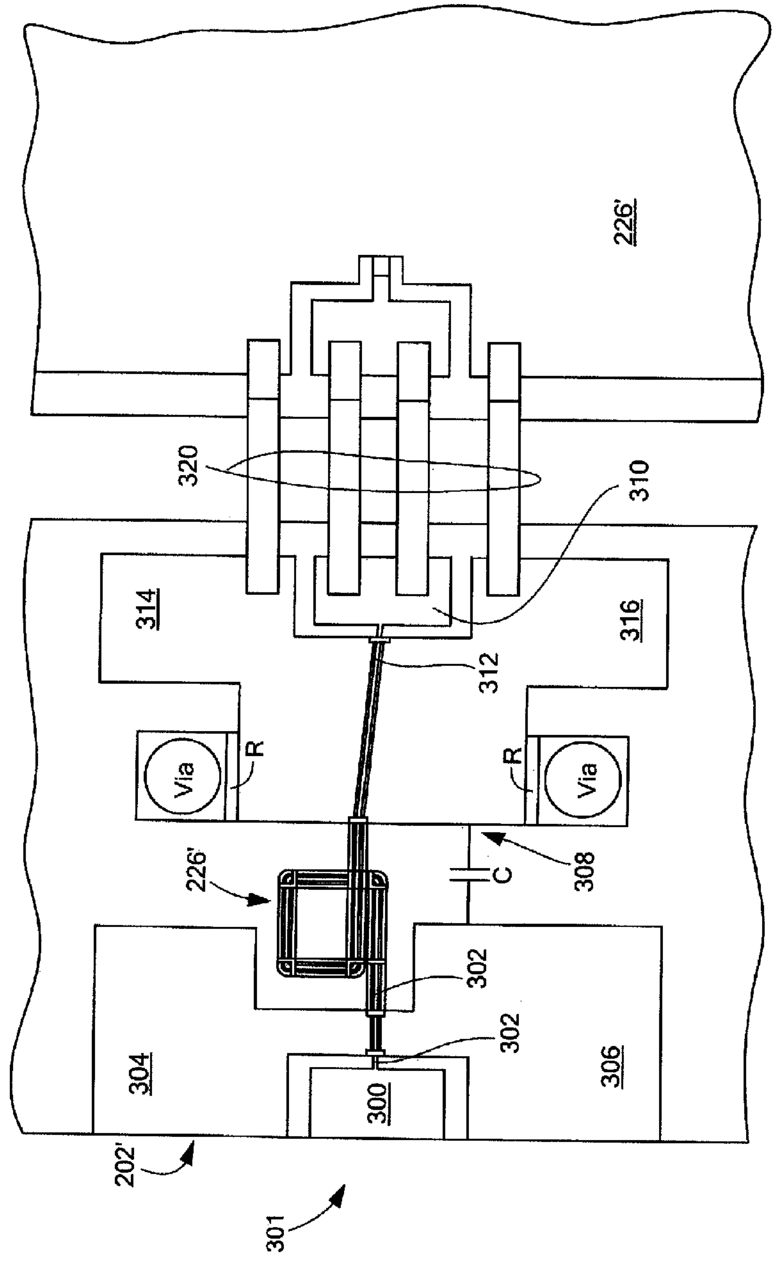
FIG. 7B is a more detailed view of a portion the input statute of FIG. 7A.

Referring now to FIGS. 7A and 7B, a microwave system 200' is shown having an input structure 202' coupled to an output structure 204' through a MMIC chip 206'. The chip 206' has formed on a top or upper surface 207' of a semiconductor substrate 208 (FIG. 7A) a plurality of devices 210, active and passive, for example, interconnected by CPW transmission lines 212, as indicated. A conductor is formed on the bottom surface of the MMIC chip 206' for mounting to a system ground or heat sink, not shown, for example. Here, the MMIC chip 206' does not have a segmented ground plane conductor; but rather uses one of the above described coupling circuit 226, 226' or 226", for example. here coupling circuit 226' between the input CPW microwave structure 202' and an input end 220 of the MMIC chip 206' and an another one of the described coupling circuits here coupling circuit 226' between an output CPW microwave structure 204' coupled to an output end 222 of the MMIC chip 206'.

The input CPW microwave structure 202' and the output CPW microwave structure 204' are identical in construction. Therefore, considering for example the input CPW microwave structure 202' reference is also made to FIG. 7B.

Figure 7C:
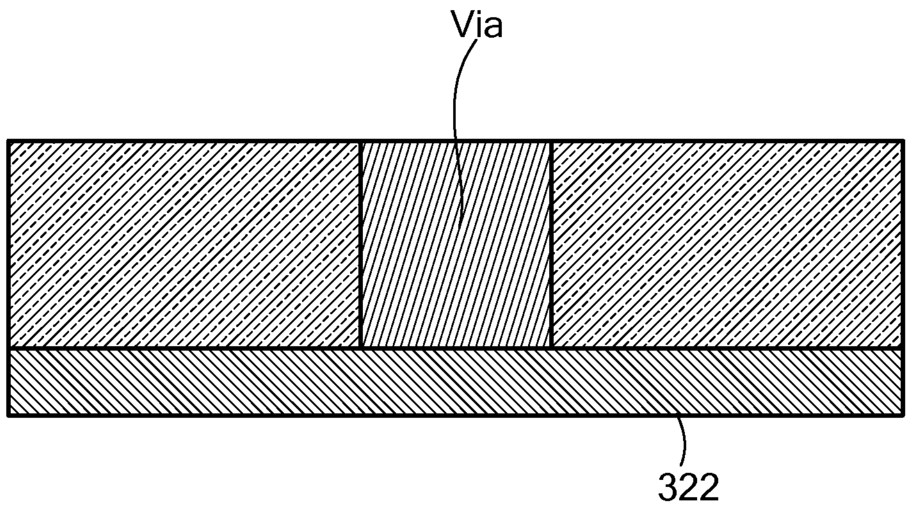
FIG. 7C is a view of a via connected to the underlying conductor.

More particularly, considering in more detail the input CPW microwave structure 202' includes: an input CPW structure 301 having an input pad 300 connected to the center or signal conductor of a CPW transmission line 302, and a pair of ground plane pads 304, 306 disposed on the sides of the center conductor 302 and input pads 300, as shown; an output CPW structure 308 having an output pad 310 connected to the center or signal conductor 312 of a CPW transmission line having a pair of ground plane pads 314, 316 disposed on the sides of the center conductor 312, as shown. The input CPW structure 301 is coupled to the output CPW structure 308 through the coupling structure 226' as shown. The output pad 310 is connected to the center conductor 214 of chip 206' and the ground plane pads 314, 316 are connected to ground plane conductors 216, 218 (FIG. 3) of the chip 206', through wires 320, as shown. It is noted that here the ground plane pads 314, 316 are connected to the underlying conductor 322 (FIG. 7C) through resistors R and via, as shown. Note the waveguide or common mode current propagates through the three top ground connections 320 just like a common mode signal. So the waveguide mode, are suppressed using common mode suppression techniques; here the inductor coupling circuit 226' and will not pass between the input CPW structure 301 and the output CPW structure 308 and will dissipate through the resistors R connected to the ground plane 322. On the other hand, balanced CPW signals will pass between the input CPW structure 301 and the output CPW structure 308. A capacitor, C, may be connected in parallel with the spiral shaped inductor 226' to form an L-C resonant tank circuit.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A transmission line structure, comprising:

a coplanar waveguide transmission line, comprising a pair of separated coplanar waveguide transmissions line sections, each one of the pair of coplanar waveguide sections comprising a center conductor disposed between and a pair of ground plane conductors; and a circuit coupled between a first one of the pair of separated coplanar waveguide transmissions line sections and a second one of the pair the pair of separated coplanar waveguide transmissions line sections for passing differential mode signal transmission between the pair of coplanar waveguide transmissions line sections and for inhibiting common mode energy from passing between the pair of coplanar waveguide transmissions line sections, the circuit comprising:

a first portion of the circuit comprising a first inductor member having a first end coupled to a first one of the pair of ground plane conductors of the first of the pair of separated coplanar waveguide transmissions line sections and a second end coupled to a first one of the pair of ground plane conductors of the second one of a pair of separated coplanar waveguide transmissions line sections for inhibiting the common mode energy at the first end of the first inductor member from passing the first inductor member;

a second portion of the circuit comprising a second inductor member having a first end coupled to the center conductor of the first of the pair of separated coplanar waveguide transmissions line sections and an second end coupled to the center conductor of the second one of a pair of separated coplanar waveguide transmissions line sections for inhibiting the common mode energy at the first end of the second inductor member from passing out of the second end of the second inductor member.

2. The transmission line structure recited 1 wherein the first inductor member is a serpentine inductor and the second inductor member is a serpentine inductor.

3. The transmission line structure recited 1 inducting a capacitor, and wherein a portion of the first inductor member and the capacitor form a resonant tank circuit tuned to the common mode signal.

4. The transmission line structure recited 1 wherein a third portion of the circuit comprises a third inductor member having a first end coupled to a second one of the pair of ground plane conductors of the first of the pair of separated coplanar waveguide transmissions line sections and a second end coupled to a second one of the pair of ground plane conductors of the second one of a pair of separated coplanar waveguide transmissions line sections for inhibiting the common mode energy at the first end of the third inductor member from passing out of the second end of the third inductor member.

5. The transmission line structure recited in claim 1 including a resistor and wherein one end of the resistor and the first end of the first inductor member are connected to the first one of the pair of ground plane conductors of the first one of the pair of separated coplanar waveguide transmissions line sections.

6. The transmission line structure recited 5 wherein the first inductor is a serpentine inductor and the second inductor is a serpentine inductor.

7. A monolithic integrated circuit, comprising:

a substrate;

a plurality of devices disposed on a surface of the substrate, a first portion of the plurality of devices being disposed on a first portion of the surface of the substrate and a second portion of the plurality of devices being disposed on a second portion of the substrate;

a plurality of coplanar waveguide sections, each one of the coplanar waveguide sections having a center conductor disposed between a pair of ground plane conductors, a first portion of the plurality of coplanar waveguide sections being disposed on the first portion of the surface of the substrate and being connected to the first portion of the plurality of devices and a second portion of the coplanar waveguide sections being disposed on the second portion of the surface of the substrate and being connected to the second portion of the plurality of devices; the first portion of the coplanar waveguide sections being separated from the second portion of the coplanar waveguide sections;

wherein the pair of ground plane conductors of the first portion of the plurality of coplanar waveguide sections is spaced from the pair of ground plane conductors of the second portion of the plurality of coplanar waveguide sections by a space between edges of the pair of ground plane conductors of the first portion of the plurality of coplanar waveguide sections and opposing edges of the pair ground plane conductors of the second portion of the plurality of coplanar waveguide sections;

wherein the pair of ground plane conductors of the first portion of the plurality of coplanar waveguide sections provide a ground plane for the first portion of the plurality of coplanar waveguide sections connected to a plurality of devices of the first portion of the plurality of devices;

a coupling circuit disposed on the substrate in the space between the pair of ground plane conductors of the first portion of the plurality of coplanar waveguide sections and the pair ground plane conductors of the second portion of the plurality of coplanar waveguide sections for suppressing common mode signals, while passing differential mode signal transmission, between the first portion of the plurality of coplanar waveguide sections and the second portion of the coplanar waveguide sections.

8. The monolithic integrated circuit recited in claim 7 wherein the coupling circuit comprises a serpentine inductor for suppressing the common mode signals.

9. The monolithic integrated circuit recited in claim 8 including a ground plane conductor disposed on a bottom of the substrate under the pair of ground plane conductors of one of the plurality of coplanar waveguide sections.

10. The monolithic integrated circuit recited in claim 7 including a ground plane conductor disposed on a bottom of the substrate under the pair of ground plane conductors of one of the plurality of coplanar waveguide sections.

11. A monolithic integrated circuit recited in claim 7 wherein the pair of ground plane conductors of the second portion of the plurality of coplanar waveguide sections provide a ground plane for the second portion of the plurality of coplanar waveguide sections connected to a plurality of devices of the second portion of the plurality of devices.

* * * * *